US012779795B2

(12) United States Patent
York

(10) Patent No.: US 12,779,795 B2
(45) Date of Patent: Nov. 3, 2026

(54) METHOD AND SYSTEM FOR MANUFACTURING A COMPOSITE COMPONENT

(71) Applicant: ROLLS-ROYCE plc, London (GB)

(72) Inventor: Alasdair S. York, Bristol (GB)

(73) Assignee: Rolls-Royce plc, London (GB)

( * ) Notice: Subject to any disclaimer, the term of this patent is extended or adjusted under 35 U.S.C. 154(b) by 191 days.

(21) Appl. No.: 18/795,303

(22) Filed: Aug. 6, 2024

(65) Prior Publication Data

US 2025/0050598 A1 Feb. 13, 2025

(30) Foreign Application Priority Data

Aug. 9, 2023 (GB) ..................................... 2312199

(51) Int. Cl.
*B29C 70/46* (2006.01)
*B29L 23/00* (2006.01)

(52) U.S. Cl.
CPC ......... *B29C 70/462* (2013.01); *B29L 2023/22* (2013.01)

(58) Field of Classification Search
CPC ....... B29C 70/00; B29C 70/462; B29C 70/46; B29C 70/40; B29C 70/28
See application file for complete search history.

(56) References Cited

U.S. PATENT DOCUMENTS

2013/0266431 A1 10/2013 Moram et al.
2018/0154594 A1 6/2018 Moram et al.
2021/0138713 A1* 5/2021 Romero Esteban .... B29C 53/84

FOREIGN PATENT DOCUMENTS

CA 3020042 A1 10/2017
EP 3288747 A1 11/2016
EP 3600854 A1 2/2020
EP 3616873 A1 3/2020
EP 3708347 A1 9/2020
EP 3970939 A1 3/2022
GB 2549158 A 10/2017
GB 2555733 A 5/2018
GB 2555833 A 5/2018

OTHER PUBLICATIONS

Great Britain search report dated Jan. 22, 2024, issued in GB Patent Application No. 2312199.9.
European Search report dated Nov. 13, 2024, issued in EP Patent Application No. 24182151.1.

* cited by examiner

*Primary Examiner* — Cedrick S Williams

(57) ABSTRACT

A method for manufacturing a composite component includes providing a tool switchable between a deposition configuration and a flange-forming configuration. The tool includes a first portion including a first deposition surface, a second portion including a second deposition surface and a pre-form support surface, and a flange-forming block including a curved surface. The method further includes depositing a composite material at least partially on each of the first deposition surface and the second deposition surface in the deposition configuration to provide a composite pre-form. The method further includes moving the second portion relative to the first portion to transition the tool to the flange-forming configuration, which causes the composite pre-form to at least partially engage each of the pre-form support surface and the curved surface. The curved surface defines a radius of a flange of the composite component.

14 Claims, 6 Drawing Sheets

METHOD AND SYSTEM FOR MANUFACTURING A COMPOSITE COMPONENT

CROSS-REFERENCE TO RELATED APPLICATIONS

This specification is based upon and claims the benefit of priority from United Kingdom patent application GB 2312199.9 filed on Aug. 9, 2023, the entire contents of which is incorporated herein by reference.

BACKGROUND

Technical Field

The present disclosure relates to a method and a system for manufacturing a composite component.

Description of the Related Art

A gas turbine engine may include a fan which is driven by a turbine to produce propulsive thrust. The fan is generally surrounded and housed by a fan casing. The fan casing may include a flange that is used to connect the fan casing to structural members of the gas turbine engine.

During operation, the gas turbine engine may experience a blade-off (or blade-out) event. The fan casing may transfer impact loads produced due to the blade-off event to the structural members of the gas turbine engine via the flange. Therefore, it may be important that the flange of the fan casing has a smooth radius and conforms to required design tolerances.

In an effort to reduce a weight of the fan casing, the fan casing may be made of composite materials. However, conventional systems and methods that are used to manufacture a composite fan casing may cause difficulties in forming a flange that is in compliance with the required design tolerances. As a result, such conventional systems and methods may compromise an ability of the composite fan casing to contain one or more blades of the fan during the blade-off event.

SUMMARY

According to a first aspect there is provided a method for manufacturing a composite component having a main body and a flange that is integral with the main body. The method includes providing a tool having a longitudinal axis and a transverse axis. The transverse axis is perpendicular to the longitudinal axis. The tool is switchable between a deposition configuration and a flange-forming configuration. The tool includes a first portion. The first portion includes a first deposition surface extending along the longitudinal axis. The tool further includes a second portion that is movable relative to the first portion. The second portion includes a second deposition surface extending along the longitudinal axis. The second portion further includes a pre-form support surface extending along the transverse axis. The tool further includes a flange-forming block connected to the second portion. The flange-forming block includes a curved surface. The method further includes providing the tool in the deposition configuration of the tool. In the deposition configuration of the tool, the second deposition surface is aligned with the first deposition surface with respect to the longitudinal axis. Further, in the deposition configuration, the pre-form support surface is disposed adjacent to the first portion. Moreover, in the deposition configuration, the flange-forming block is spaced apart from the first portion with respect to the transverse axis. The method further includes depositing a composite material at least partially on each of the first deposition surface of the first portion and the second deposition surface of the second portion in the deposition configuration of the tool to provide a composite pre-form having a first region corresponding to the main body of the composite component and a second region corresponding to the flange of the composite component. The method further includes moving the second portion relative to the first portion to transition the tool from the deposition configuration to the flange-forming configuration of the tool. In the flange-forming configuration of the tool, the second deposition surface is spaced apart from the first deposition surface with respect to the transverse axis. Further, in the flange-forming configuration, the pre-form support surface is spaced apart from the first portion with respect to the longitudinal axis. Moreover, in the flange-forming configuration, the flange-forming block is disposed between the first portion and the second portion with respect to the longitudinal axis, such that the curved surface of the flange-forming block is at least partially aligned with the first deposition surface. The transition of the tool from the deposition configuration to the flange-forming configuration causes the second region of the composite pre-form to slide relative to the second deposition surface along the longitudinal axis and at least partially engage each of the pre-form support surface of the second portion and the curved surface of the flange-forming block. The curved surface of the flange-forming block defines a radius of the flange of the composite component.

The method of the present disclosure may be used to manufacture the composite component with an improved quality of the flange as compared to conventional manufacturing methods. Specifically, the method may facilitate forming the flange of the composite component in compliance with required design tolerances. For example, the composite component manufactured by the method may have a smooth surface transition from the main body to the flange, and the radius of the flange may be within the required design tolerances.

In the flange-forming configuration of the tool, the curved surface of the flange-forming block may provide support to the composite pre-form, or more specifically, to the second region of the composite pre-form. This may ensure that the radius of the flange is formed in compliance with the required design tolerances.

In some embodiments, moving the second portion relative to the first portion to transition the tool from the deposition configuration to the flange-forming configuration includes moving the second portion of the tool along an inclined axis that is oblique to the transverse axis to transition the tool from the deposition configuration to an intermediate configuration of the tool. In the intermediate configuration of the tool, the pre-form support surface is spaced apart from the first portion with respect to the longitudinal axis. Further, in the intermediate configuration, the second deposition surface is spaced apart from the first deposition surface with respect to the transverse axis. Moreover, in the intermediate configuration, the flange-forming block is spaced apart from the first deposition surface with respect to the transverse axis.

In some embodiments, moving the second portion relative to the first portion to transition the tool from the deposition configuration to the flange-forming configuration further includes moving the second portion of the tool along the transverse axis to transition the tool from the intermediate configuration to the flange-forming configuration.

The aforementioned movement of the second portion relative to the first portion may ensure that the composite pre-form does not get damaged (e.g., sheared) during the transition of the tool from the deposition configuration to the flange-forming configuration. Therefore, the composite component manufactured by the method may have an improved integrity.

In some embodiments, the method further includes moving the curved surface relative to the second portion along the transverse axis to transition the tool to the flange-forming configuration. This may allow adjustment of the curved surface along the transverse axis based on desired manufacturing tolerances of the composite component and thermal expansion tolerances of the tool. For example, the curved surface may be adjusted to adapt the tool for different threshold forming and curing temperatures of different composite materials.

In some embodiments, the method further includes forming a fluid-tight seal between the first portion, the flange-forming block, and the second portion in the flange-forming configuration. The fluid-tight seal formed between the first portion, the flange-forming block, and the second portion in the flange-forming configuration may allow providing the composite pre-form with vacuum consolidation in the flange-forming configuration during a curing operation.

In some embodiments, the method further includes providing an external tool. The external tool includes a flange support. The flange support includes a curved support surface corresponding to the curved surface of the flange-forming block. The method further includes positioning the external tool proximal to the first portion, such that, in the flange-forming configuration of the tool, the composite pre-form is disposed between and at least partially engaged with the curved support surface of the flange support and the curved surface of the flange-forming block. The external tool may reduce or prevent sliding of the first region of the composite pre-form relative to the first deposition surface and along the longitudinal axis during the transition of the tool from the deposition configuration to the flange-forming configuration.

According to a second aspect, there is provided a system for manufacturing a composite component having a main body and a flange integral with the main body. The system includes a tool having a longitudinal axis and a transverse axis. The transverse axis is perpendicular to the longitudinal axis. The tool is switchable between a deposition configuration and a flange-forming configuration. The tool includes a first portion. The first portion includes a first deposition surface extending along the longitudinal axis. The tool further includes a second portion. The second portion is movable relative to the first portion. The second portion includes a second deposition surface extending along the longitudinal axis. The second portion further includes a pre-form support surface extending along the transverse axis. The tool further includes a flange-forming block connected to the second portion. The flange-forming block includes a curved surface. The system further includes a deposition device. The deposition device is configured to deposit a composite material at least partially on the first deposition surface and the second deposition surface in the deposition configuration of the tool. In deposition configuration, the second deposition surface is aligned with the first deposition surface with respect to the longitudinal axis. Further, in deposition configuration, the pre-form support surface is disposed adjacent to the first portion. Moreover, in deposition configuration, the flange-forming block is spaced apart from the first deposition surface with respect to the transverse axis. The deposition device deposits the composite material at least partially on each of the first deposition surface of the first portion and the second deposition surface of the second portion in the deposition configuration of the tool to provide a composite pre-form having a first region corresponding to the main body of the composite component and a second region corresponding to the flange of the composite component. The second portion is moved relative to the first portion to transition the tool from the deposition configuration to the flange-forming configuration. In the flange-forming configuration, the second deposition surface is spaced apart from the first deposition surface with respect to the transverse axis. Further, in the flange-forming configuration, the pre-form support surface is spaced apart from the first portion with respect to the longitudinal axis. Moreover, in the flange-forming configuration, the flange-forming block is disposed between the first portion and the second portion with respect to the longitudinal axis, such that the curved surface of the flange-forming block is at least partially aligned with the first deposition surface. The transition of the tool from the deposition configuration to the flange-forming configuration causes the second region of the composite pre-form to slide relative to the second deposition surface along the longitudinal axis and at least partially engage each of the pre-form support surface of the second portion and the curved surface of the flange-forming block. The curved surface of the flange-forming block defines a radius of the flange of the composite component.

The system of the present disclosure may be used to manufacture the composite component with an improved quality of the flange as compared to conventional manufacturing systems. Specifically, the system may facilitate forming the flange of the composite component in compliance with required design tolerances. For example, the composite component manufactured by the system may have a smooth surface transition from the main body to the flange, and the radius of the flange may be within the required design tolerances.

In the flange-forming configuration of the tool, the curved surface of the flange-forming block may provide support to the composite pre-form, or more specifically, to the second region of the composite pre-form. This may ensure that the radius of the flange is formed in compliance with the required design tolerances.

In some embodiments, the tool further has an intermediate configuration between the deposition configuration and the flange-forming configuration. In the intermediate configuration, the pre-form support surface is spaced apart from the first portion with respect to the longitudinal axis. Further, in the intermediate configuration, the second deposition surface is spaced apart from the first deposition surface with respect to the transverse axis. Moreover, in the intermediate configuration, the flange-forming block is spaced apart from the first deposition surface with respect to the transverse axis.

In some embodiments, the second portion moves along an inclined axis that is oblique to the transverse axis to transition the tool from the deposition configuration to the intermediate configuration. Moreover, the second portion moves along the transverse axis to transition the tool from the intermediate configuration to the flange-forming configuration.

The aforementioned movement of the second portion relative to the first portion may ensure that the composite pre-form does not get damaged (e.g., sheared) during the transition of the tool from the deposition configuration to the flange-forming configuration. Therefore, the composite component manufactured by the system may have an improved integrity.

In some embodiments, the tool further includes a slide. The slide is configured to move the second portion along a movement path. The movement path includes a first path portion obliquely inclined with respect to the transverse axis and extending away from the first portion. A movement of the second portion along the first path portion transitions the tool from the deposition configuration to the intermediate configuration. The movement path further includes a second path portion extending along the transverse axis. The movement of the second portion along the second path portion transitions the tool from the intermediate configuration to the flange-forming configuration. The slide may facilitate the movement of the second portion relative to the first portion to transition the tool from the deposition configuration to the flange-forming configuration.

In some embodiments, the flange-forming block further includes a threaded portion. The threaded portion is threadably connected to the second portion, such that the curved surface is movable relative to the second portion along the transverse axis. This may allow adjustment of the curved surface along the transverse axis based on desired manufacturing tolerances of the composite component and thermal expansion tolerances of the tool. For example, the curved surface may be adjusted to adapt the tool for different threshold forming and curing temperatures of different composite materials.

In some embodiments, the tool further includes a seal. The seal is configured to form a fluid-tight seal between the first portion, the flange-forming block, and the second portion in the flange-forming configuration. The fluid-tight seal formed between the first portion, the flange-forming block, and the second portion in the flange-forming configuration may allow providing the composite pre-form with vacuum consolidation in the flange-forming configuration during a curing operation.

In some embodiments, the system further includes an external tool. The external tool includes a flange support. The flange support includes a curved support surface corresponding to the curved surface of the flange-forming block. The external tool is configured to be positioned proximal to the first portion, such that, in the flange-forming configuration of the tool, the composite pre-form is disposed between and at least partially engaged with the curved support surface of the flange support and the curved surface of the flange-forming block. The external tool may reduce or prevent sliding of the first region of the composite pre-form relative to the first deposition surface and along the longitudinal axis during the transition of the tool from the deposition configuration to the flange-forming configuration.

According to a third aspect, there is provided a composite component that is manufactured by the method of the first aspect. The composite component manufactured by the method of the first aspect may have an improved quality of the flange. The flange of the composite component manufactured by the method of the first aspect may be within required design tolerances.

According to a fourth aspect, there is provided a gas turbine engine including the composite component of the third aspect.

In some embodiments, the composite component is a fan casing that houses a fan. The fan casing may be capable of transferring impact loads produced due to a blade-off event to structural members of the gas turbine engine via the flange.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The gearbox may be a reduction gearbox (in that the output to the fan is a lower rotational rate than the input from the core shaft). Any type of gearbox may be used.

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. The bypass duct may be substantially annular. The bypass duct may be radially outside the engine core. The radially outer surface of the bypass duct may be defined by a nacelle and/or a fan case.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e., the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre.

The fan of a gas turbine as described and/or claimed herein may have any desired number of fan blades, for example 14, 16, 18, 20, 22, 24 or 26 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
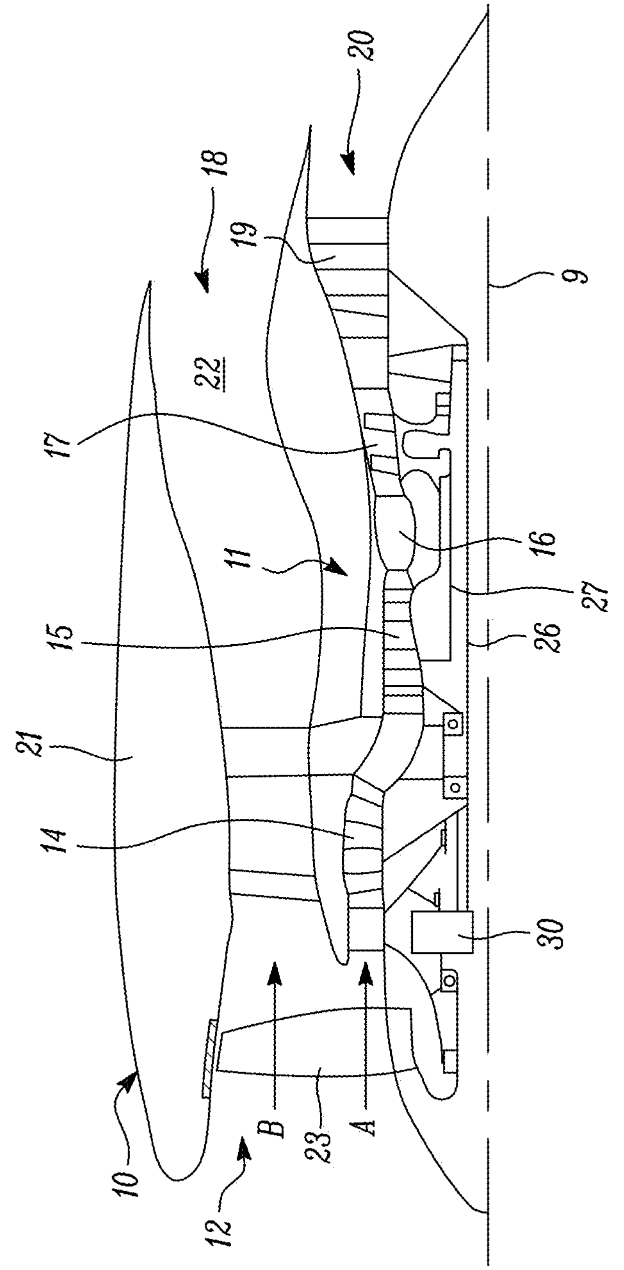
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

Figure 2B:
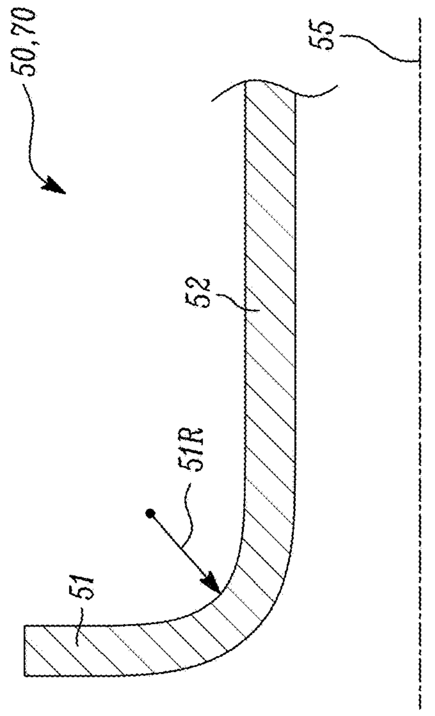
FIG. 2B is a schematic cross-sectional view of a portion of the composite component taken along a line 1-1 of FIG. 2A.
Figure 2A:
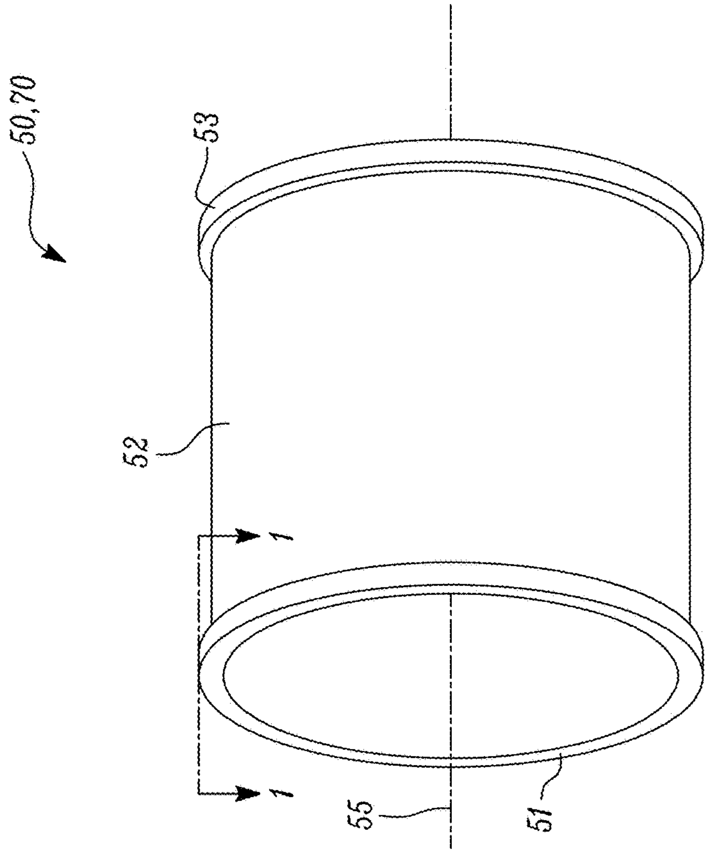
FIG. 2A is a schematic perspective view of a composite component.

FIG. 2A shows a schematic perspective view of a composite component 50 in accordance with an embodiment of the present disclosure. FIG. 2B shows a cross-sectional view of a portion of the composite component 50 taken along a line 1-1 of FIG. 2A in accordance with an embodiment of the present disclosure.

Referring to FIGS. 2A and 2B, the composite component 50 includes a main body 52. The main body 52 may extend along a component axis 55. The composite component 50 further includes a flange 51 that is integral with the main body 52. The flange 51 may extend perpendicularly with respect to the component axis 55 from the main body 52. As shown in FIG. 2B, the flange 51 has a radius 51R.

The composite component 50 may further include a flange 53 that is integral with the main body 52 and opposite to the flange 51. The flange 53 may extend perpendicularly with respect to the component axis 55 from the main body 52.

In the illustrated embodiment of FIG. 2A, the main body 52 is generally cylindrical. Specifically, the main body 52 may circumferentially extend about the component axis 55. However, it may be noted that the main body 52 may have any suitable shape, such as a cubical, a cuboidal, or any suitable polygonal shape.

The composite component 50 may be made of a composite material, such as reinforced plastics (e.g., carbon fibre reinforced polymer (CFRP)), ceramic matrix composites (CMC), and the like. For example, the composite component 50 may be made of glass, carbon, boron, or aramid (e.g., Kevlar™) fibre reinforced composite.

In some embodiments, the gas turbine engine 10 (shown in FIG. 1) may include the composite component 50. Specifically, in some embodiments, the composite component 50 may be a fan casing 70 that houses the fan 23 (shown in FIG. 1) of the gas turbine engine 10. In such embodiments, the flange 51 may be a forward flange, and the flange 53 may be an aft flange of the fan casing 70. The fan casing 70 may be connected to structural members (e.g., the nacelle 21) of the gas turbine engine 10 via the flanges 51, 53.

Figure 3:
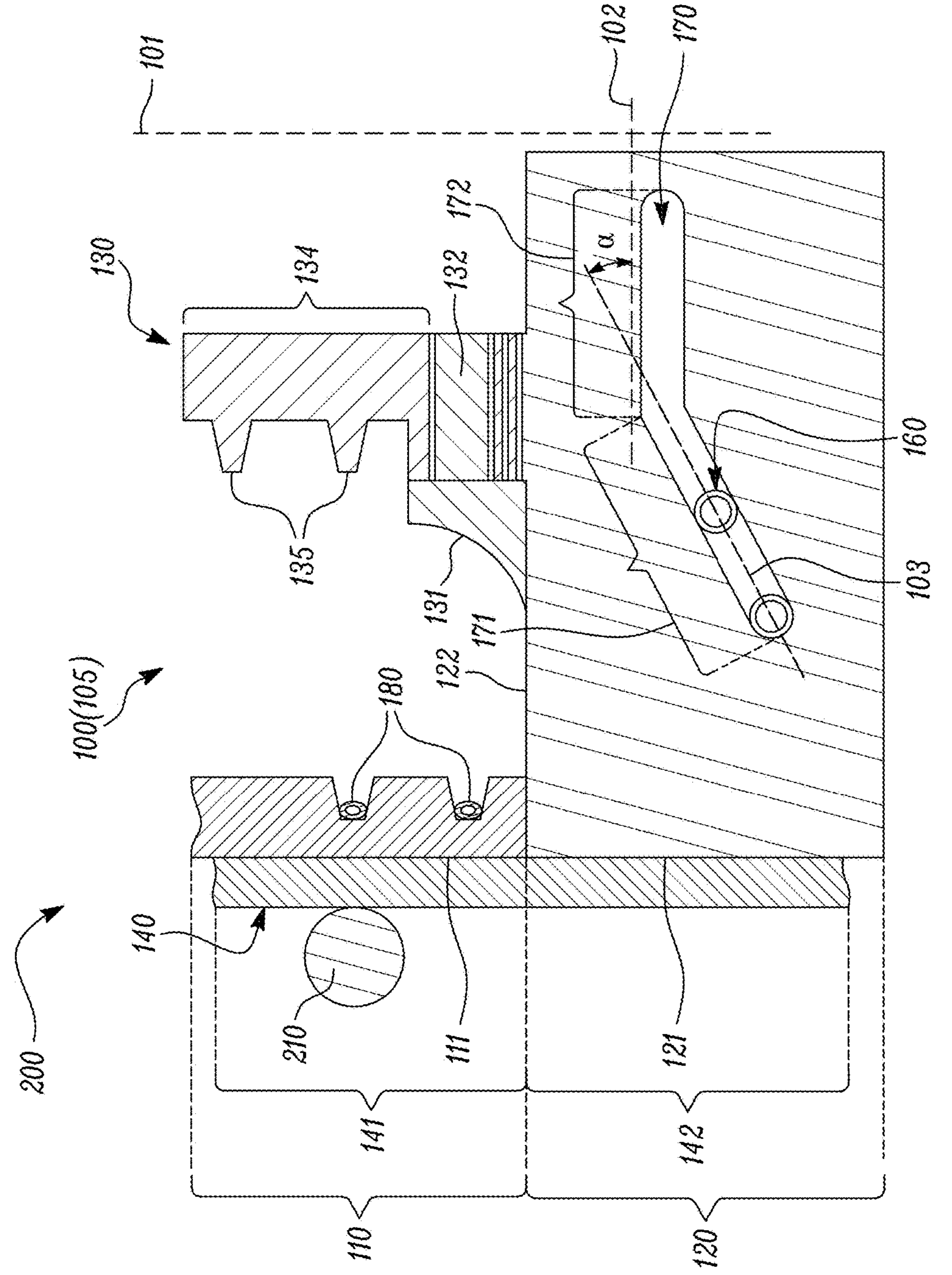
FIG. 3 is a schematic cross-sectional view of a system including a tool in a deposition configuration.
Figure 4:
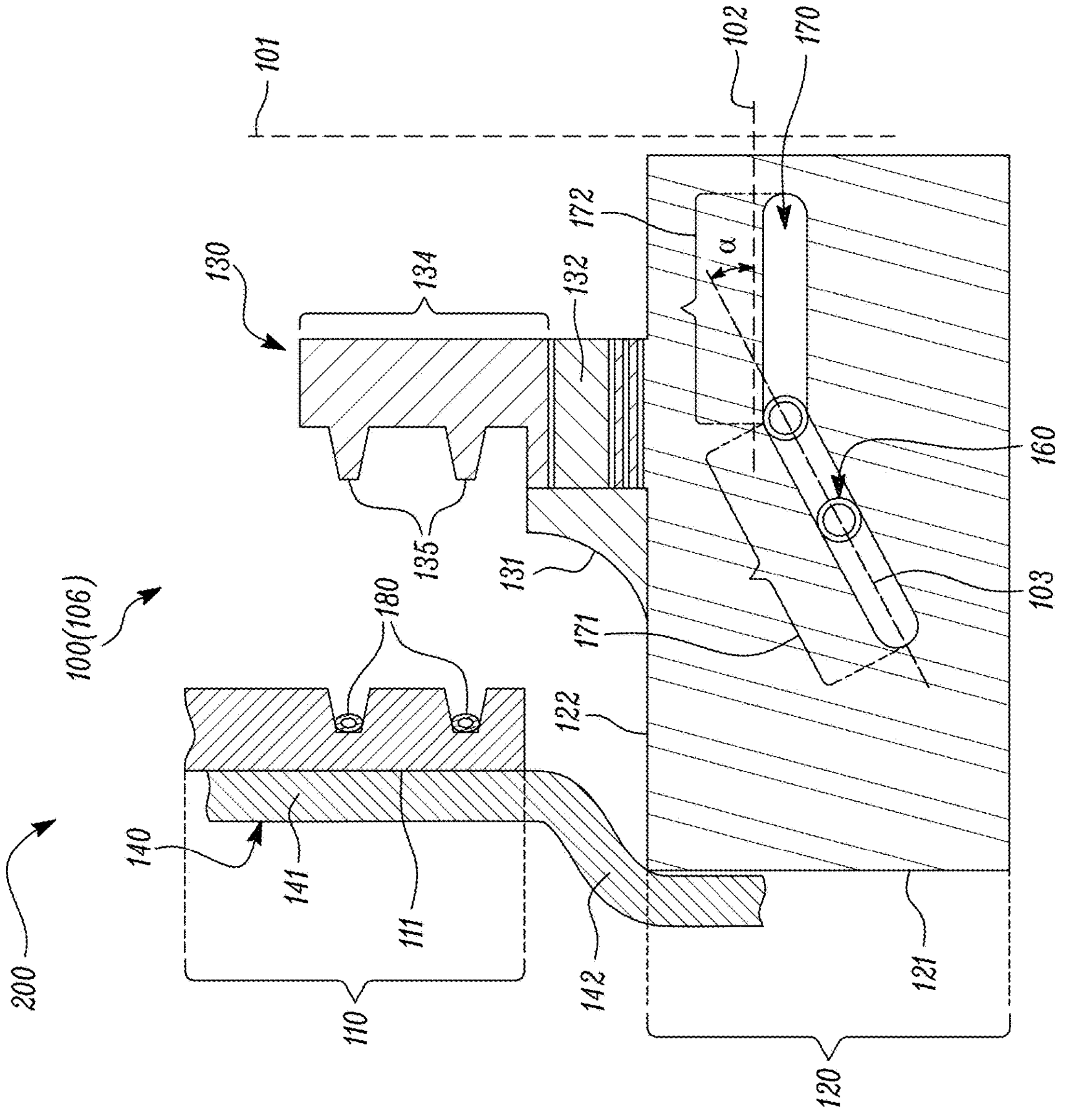
FIG. 4 is a schematic cross-sectional view of the system of FIG. 3 with the tool in an intermediate configuration.
Figure 5:
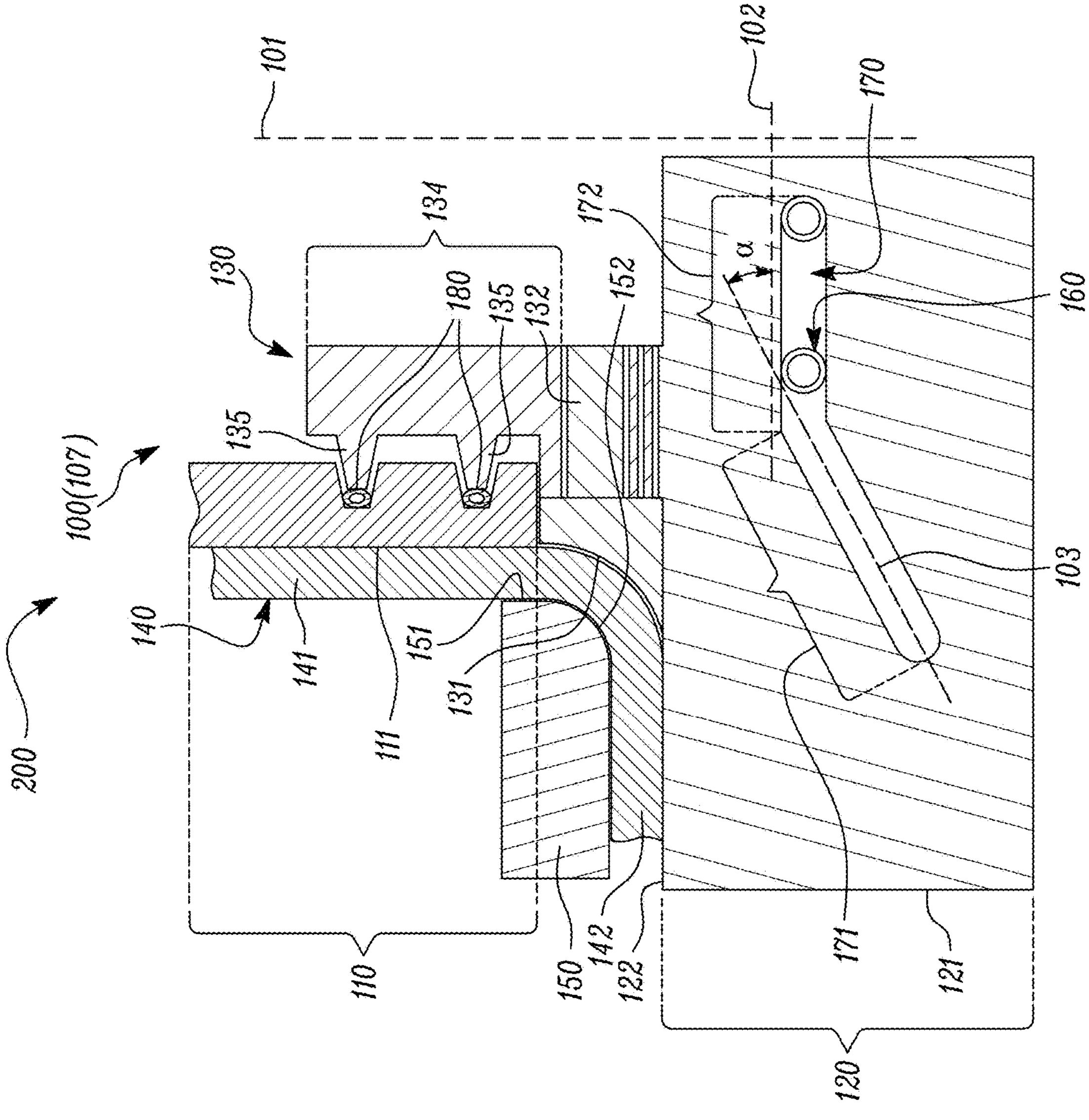
FIG. 5 is a schematic cross-sectional view of the system of FIG. 3 with the tool in a flange-forming configuration.

FIGS. 3 to 5 show schematic cross-sectional views of a system 200 for manufacturing a composite component having a main body and a flange integral with the main body (e.g., the composite component 50 of FIGS. 2A and 2B) in accordance with an embodiment of the present disclosure.

The system 200 includes a tool 100 having a longitudinal axis 101 and a transverse axis 102. The transverse axis 102 is perpendicular to the longitudinal axis 101. In some embodiments, the tool 100 may be configured to be supported on a horizontal surface, for example, on a workshop floor, such that the transverse axis 102 extends along the horizontal surface and the longitudinal axis 101 extends perpendicularly to the horizontal surface. However, in some other embodiments, the tool 100 may be supported in other orientations.

The tool 100 includes a first portion 110 and a second portion 120 that is movable relative to the first portion 110. The first portion 110 includes a first deposition surface 111 extending along the longitudinal axis 101. The second portion 120 includes a second deposition surface 121 extending along the longitudinal axis 101. The second portion 120 further includes a pre-form support surface 122 extending along the transverse axis 102.

The tool 100 further includes a flange-forming block 130 connected to the second portion 120. The flange-forming block 130 includes a curved surface 131. The flange-forming block 130 may further include a threaded portion 132 that is threadably connected to the second portion 120, such that the curved surface 131 is movable relative to the second portion 120 along the transverse axis 102. For example, the threaded portion 132 may be rotated about the transverse axis 102 to move the curved surface 131 along the transverse axis 102. In some embodiments, the threaded portion 132 may be captively connected to the second portion 120. Alternatively, the curved surface 131 may be movable relative to the second portion 120 along the transverse axis 102 using other mechanisms.

The flange-forming block 130 may further include a sealing portion 134. In some embodiments, the sealing portion 134 may include one or more protrusions 135 extending along the transverse axis 102. As will be described herein, the sealing portion 134, or more specifically, the one or more protrusions 135, may facilitate forming a fluid-tight seal between the first portion 110, the second portion 120, and the flange-forming block 130.

The first portion 110 may have any suitable shape based upon a desired shape of the main body 52 (shown in FIG. 2A) of the composite component 50. In some embodiments, the first portion 110 may include a plurality of panels (not shown) that together define the first deposition surface 111.

The second deposition surface 121 of the second portion 120 may correspond to the first deposition surface 111 of the first portion 110. In some embodiments, the second portion 120 may include a plurality of segments (not shown) that together define the second deposition surface 121. Further, the flange-forming block 130 may include a plurality of flange-forming blocks 130. Each of the plurality of flange-forming blocks 130 may be connected to a corresponding segment from the plurality of segments of the second portion 120. The curved surface 131 of each of the plurality of flange-forming blocks 130 may correspond to the first deposition surface 111 of the first portion 110.

As an example, for manufacturing the composite component 50 shown in FIG. 2A, the first portion 110 may be generally cylindrical. Therefore, each of the plurality of panels of the first portion 110 may be curved and extend circumferentially about the longitudinal axis 101, such that the first portion 110 is generally cylindrical and the first deposition surface 111 is curved and extends circumferentially about the longitudinal axis 101. Further, each of the plurality of segments of the second portion 120 may extend circumferentially about the longitudinal axis 101, such that the second deposition surface 121 is curved and extends circumferentially about the longitudinal axis 101. Moreover, the curved surface 131 of each of the plurality of flange-forming blocks 130 may extend circumferentially about the longitudinal axis 101.

The tool 100 is switchable between a deposition configuration 105 (shown in FIG. 3) and a flange-forming configuration 107 (shown in FIG. 5).

As shown in FIG. 3, in the deposition configuration 105 of the tool 100, the second deposition surface 121 is aligned with the first deposition surface 111 with respect to the longitudinal axis 101. Further, in the deposition configuration 105, the pre-form support surface 122 is disposed adjacent to the first portion 110. Furthermore, in the deposition configuration 105, the flange-forming block 130 is spaced apart from the first deposition surface 111 with respect to the transverse axis 102.

The system 200 further includes a deposition device 210 (schematically depicted by circle in FIG. 3). The deposition device 210 is configured to deposit a composite material at least partially on the first deposition surface 111 and the second deposition surface 121 in the deposition configuration 105 of the tool 100. The composite material may include reinforced plastics (e.g., carbon fibre reinforced polymer (CFRP)), ceramic matrix composites (CMC), and the like. For example, the composite material may include glass, carbon, boron, or aramid (e.g., Kevlar™) fibre reinforced composite. The composite material may be deposited using the deposition device 210 by any suitable techniques, such as automated tape laying (ATL), automated fibre placement (AFP), automated filament winding, manual lay-up, and the like.

The deposition device 210 deposits the composite material at least partially on each of the first deposition surface 111 of the first portion 110 and the second deposition surface 121 of the second portion 120 in the deposition configuration 105 of the tool 100 to provide a composite pre-form 140 having a first region 141 corresponding to the main body 52 (shown in FIG. 2) of the composite component 50 and a second region 142 corresponding to the flange 51 of the composite component 50. In some embodiments, the first region 141 of the composite pre-form 140 may correspond to the composite material that is deposited on the first deposition surface 111, and the second region 142 of the composite pre-form 140 may correspond to the composite material that is deposited on the second deposition surface 121.

In some embodiments, the system 200 may further include a vacuum bag (not shown). Subsequent to the provision of the composite pre-form 140, the vacuum bag may be placed over the composite pre-form 140 and sealed against the tool 100 (e.g., using tapes). Specifically, the vacuum bag may be placed over the composite pre-form 140 and sealed against the first portion 110 and the second portion 120 of the tool 100.

The system 200 may further include one or more vacuum tubes (not shown). The vacuum tubes may be extended through the vacuum bag to a space enclosed between the tool 100 and the vacuum bag. The system 200 may further include a vacuum source (not shown), such as a vacuum pump. The vacuum source may be applied to the vacuum tubes to create a partial vacuum in the space occupied by the composite pre-form 140. The partial vacuum may cause an unbalanced pressure to be applied through the vacuum bag onto the composite pre-form 140. This process of using the vacuum source to create the partial vacuum may be referred to herein as “vacuum consolidation”. The vacuum source may be configured to at least partially remove entrapped air from the composite pre-form 140 and consolidate the composite pre-form 140 during vacuum consolidation.

The tool 100 may further include one or more heaters (not shown) thermally coupled to the first portion 110, the second portion 120, and the flange-forming block 130. The one or more heaters may include, for example, heater mats. Each of the first portion 110, the second portion 120, and the flange-forming block 130 may be made of a thermally conductive material (e.g., stainless steel and aluminium).

The system 200 may further include a controller (not shown). The controller may be communicably coupled to the one or more heaters and the vacuum source. The controller may control the one or more heaters and the vacuum source during flange-forming and curing operations, as will be described below.

Upon provision of the composite pre-form 140, the flange-forming operation may be initiated. In the flange-forming operation, vacuum consolidation may be performed. Further, in the flange-forming operation, the controller may control the one or more heaters to heat the composite pre-form 140 to at least a threshold forming temperature. The threshold forming temperature may depend upon the composite material deposited to form the composite pre-form 140. For example, in some cases, the threshold forming temperature may be 80° C.

In some examples, the tool 100 may be transitioned from the deposition configuration 105 to the flange-forming configuration 107 (shown in FIG. 5) after consolidating the composite pre-form 140 via the vacuum source, and heating the composite pre-form 140 to at least the threshold forming temperature. The composite pre-form 140 may be kept at the threshold forming temperature during the transition of the tool 100 from the deposition configuration 105 to the flange-forming configuration 107. It may be noted that the vacuum source may be turned off before transitioning the tool 100 from the deposition configuration 105 to the flange-forming configuration 107. In other words, the vacuum consolidation may be stopped before transitioning the tool 100 from the deposition configuration 105 to the flange-forming configuration 107.

The second portion 120 is moved relative to the first portion 110 to transition the tool 100 from the deposition configuration 105 to the flange-forming configuration 107 (shown in FIG. 5). In some embodiments, the controller may be configured to control an actuator (not shown) to move the second portion 120 relative to the first portion 110 to transition the tool 100 from the deposition configuration 105 to the flange-forming configuration 107. In some other embodiments, the second portion 120 may be manually moved relative to the first portion 110 to transition the tool 100 from the deposition configuration 105 to the flange-forming configuration 107.

As shown in FIG. 4, the tool 100 may further have an intermediate configuration 106 between the deposition configuration 105 (shown in FIG. 3) and the flange-forming configuration 107 (shown in FIG. 5). In the intermediate configuration 106, the pre-form support surface 122 may be spaced apart from the first portion 110 with respect to the longitudinal axis 101. Further, in the intermediate configuration 106, the second deposition surface 121 may be spaced apart from the first deposition surface 111 with respect to the transverse axis 102. Moreover, in the intermediate configuration 106, the flange-forming block 130 may be spaced apart from the first deposition surface 111 with respect to the transverse axis 102.

Referring to FIGS. 3 and 4, in some embodiments, the second portion 120 may move along an inclined axis 103 that is oblique to the transverse axis 102 to transition the tool 100 from the deposition configuration 105 to the intermediate configuration 106. The inclined axis 103 may form an angle $\alpha$ with the transverse axis 102. In some embodiments, the angle $\alpha$ may range from 10 degrees to 50 degrees. In some embodiments, the angle $\alpha$ may be 30 degrees.

In some embodiments, the tool 100 may further include a slide 160 configured to move the second portion 120 along a movement path 170. The movement path 170 may include a first path portion 171 obliquely inclined with respect to the transverse axis 102 and extending away from the first portion 110. Specifically, the first path portion 171 may extend along the inclined axis 103. A movement of the second portion 120 along the first path portion 171 may transition the tool 100 from the deposition configuration 105 to the intermediate configuration 106.

Referring to FIGS. 3 to 5, as discussed above, the second portion 120 is moved relative to the first portion 110 to transition the tool 100 from the deposition configuration 105 to the flange-forming configuration 107. In the flange-forming configuration 107, the second deposition surface 121 is spaced apart from the first deposition surface 111 with respect to the transverse axis 102. Further, in the flange-forming configuration 107, the pre-form support surface 122 is spaced apart from the first portion 110 with respect to the longitudinal axis 101. Moreover, in the flange-forming configuration 107, the flange-forming block 130 is disposed between the first portion 110 and the second portion 120 with respect to the longitudinal axis 101, such that the curved surface 131 of the flange-forming block 130 is at least partially aligned with the first deposition surface 111.

In some embodiments, the second portion 120 may move along the transverse axis 102 to transition the tool from the intermediate configuration 106 to the flange-forming configuration 107.

In some embodiments, the movement path 170 may further include a second path portion 172 extending along the transverse axis 102. The movement of the second portion 120 along the second path portion 172 may transition the tool 100 from the intermediate configuration 106 to the flange-forming configuration 107.

The transition of the tool 100 from the deposition configuration 105 to the flange-forming configuration 107 causes the second region 142 of the composite pre-form 140 to slide relative to the second deposition surface 121 along the longitudinal axis 101 and at least partially engage each of the pre-form support surface 122 of the second portion 120 and the curved surface 131 of the flange-forming block 130. The curved surface 131 of the flange-forming block 130 defines the radius 51R (shown in FIG. 2B) of the flange 51 of the composite component 50.

The system 200 may be used to manufacture the composite component 50 (see FIGS. 2A and 2B) with an improved quality of the flange 51 as compared to conventional manufacturing systems. Specifically, the system 200 may facilitate forming the flange 51 of the composite component 50 in compliance with required design tolerances. For example, the composite component 50 manufactured by the system 200 may have a smooth surface transition from the main body 52 to the flange 51, and the radius 51R of the flange 51 may be within the required design tolerances.

In the flange-forming configuration 107 of the tool 100, the curved surface 131 of the flange-forming block 130 may provide support to the composite pre-form 140, or more specifically, to the second region 142 of the composite pre-form 140. This may ensure that the radius 51R of the flange 51 is formed in compliance with the required design tolerances.

Advantageously, the transition of the tool 100 from the deposition configuration 105 to the flange-forming configuration 107 may not damage (e.g., shear) the composite pre-form 140. Specifically, the movement of the second portion 120 along the inclined axis 103 from the deposition configuration 105 to the intermediate configuration 106, and along the transverse axis 102 from the intermediate configuration 106 to the flange-forming configuration 107 may ensure that the composite pre-form 140 does not get damaged (e.g., sheared) during the transition of the tool 100 from the deposition configuration 105 to the flange-forming configuration 107. Therefore, the composite component 50 manufactured by the system 200 may have improved integrity.

As discussed above, the flange-forming block 130 may be movable relative to the second portion 120 along the longitudinal axis 101. This may allow adjustment of the flange-forming block 130 along the longitudinal axis 101 based on desired manufacturing tolerances of the composite component 50 and thermal expansion tolerances of the tool 100. For example, the flange-forming block 130 may be adjusted to adapt the tool 100 for different threshold forming and curing temperatures of different composite materials.

In some embodiments, the system 200 may further include an external tool 150. The external tool 150 may include a flange support 151. The flange support 151 may include a curved support surface 152 corresponding to the curved surface 131 of the flange-forming block 130. The external tool 150 may be configured to be positioned proximal to the first portion 110, such that, in the flange-forming configuration 107 of the tool 100, the composite pre-form 140 is disposed between and at least partially engaged with the curved support surface 152 of the flange support 151 and the curved surface 131 of the flange-forming block 130.

In some embodiments, the external tool 150 may be positioned proximal to first portion 110 in the deposition configuration 105 of the tool 100, such that the flange support 151 at least partially engages the composite pre-form 140. The transition of the tool 100 from the deposition configuration 105 to the flange-forming configuration 107 may result in the composite pre-form 140 being disposed between and at least partially engaging with the curved support surface 152 of the flange support 151 and the curved surface 131 of the flange-forming block 130. The external tool 150 may reduce or prevent sliding of the first region 141 of the composite pre-form 140 relative to the first deposition surface 111 and along the longitudinal axis 101 during the transition of the tool 100 from the deposition configuration 105 to the flange-forming configuration 107.

In some embodiments, the tool 100 may further include a seal 180 configured to form a fluid-tight seal between the first portion 110, the flange-forming block 130, and the second portion 120 in the flange-forming configuration 107. The seal 180 may include, for example, one or more gaskets. In some embodiments, the seal 180 may be attached to the first portion 110 opposite to the first deposition surface 111, such that, in the flange-forming configuration 107, the sealing portion 134, or more specifically, the one or more protrusions 135 of the sealing portion 134 engages the seal 180 to form the fluid-tight seal between the first portion 110, the flange-forming block 130, and the second portion 120. In some other embodiments, the seal 180 may be attached to the sealing portion 134 of the flange-forming block 130, such that, in the flange-forming configuration 107, the seal 180 engages the first portion 110 opposite to the first deposition surface 111 to form the fluid-tight seal between the first portion 110, the flange-forming block 130, and the second portion 120.

After the tool 100 is transitioned from the deposition configuration 105 to the flange-forming configuration 107, the curing operation may be initiated. In the curing operation, the controller may control the one or more heaters of the first portion 110, the second portion 120, and the flange-forming block 130 to heat the composite pre-form 140 to at least a threshold curing temperature. The threshold curing temperature may depend upon the composite material that is deposited to form the composite pre-form 140. For example, in some cases, the threshold curing temperature may be 120° C. Further, during the curing operation, the controller may control the vacuum source to carry out the vacuum consolidation. The fluid-tight seal formed by the seal 180 may allow the vacuum consolidation to be carried out in the flange-forming configuration 107 of the tool 100.

After the curing operation, the controller may turn off the one or more heaters and the composite pre-form 140 may be allowed to cool on the tool 100. After cooling, the composite component 50 (see FIGS. 2A and 2B) may be formed. The vacuum bag and associated equipment may be subsequently removed from the tool 100 and the composite component 50.

Figure 6:
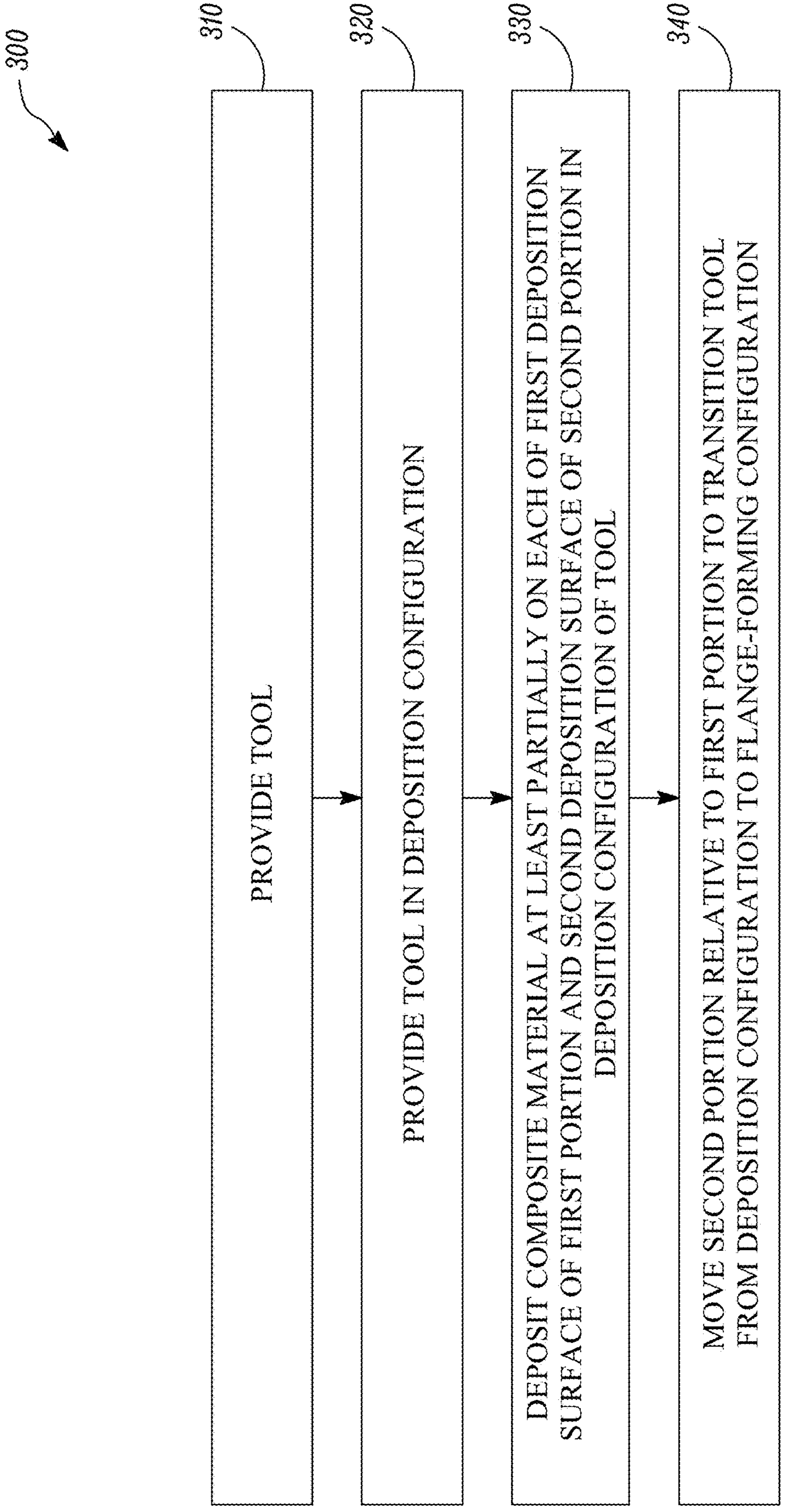
FIG. 6 is a flowchart depicting various steps of a method for manufacturing a composite component.

FIG. 6 shows a flowchart depicting various steps of a method 300 for manufacturing a composite component having a main body and a flange that is integral with the main body (e.g., the composite component 50 of FIGS. 2A and 2B) in accordance with an embodiment of the present disclosure. The method 300 may be carried out using the system 200 of FIGS. 3-5. Therefore, the method 300 will be described with additional reference to FIGS. 3-5.

At step 310, the method 300 includes providing a tool having a longitudinal axis and a transverse axis that is perpendicular to the longitudinal axis. The tool is switchable between a deposition configuration and a flange-forming configuration. The tool includes a first portion including a first deposition surface extending along the longitudinal axis. The tool further includes a second portion that is movable relative to the first portion. The second portion includes a second deposition surface extending along the longitudinal axis. The second portion further includes a pre-form support surface extending along the transverse axis. The tool further includes a flange-forming block connected to the second portion. The flange-forming block includes a curved surface. For example, the method 300 may include providing the tool 100 switchable between the deposition configuration 105 and the flange-forming configuration 107.

At step 320, the method 300 includes providing the tool in the deposition configuration. In the deposition configuration of the tool, the second deposition surface is aligned with the first deposition surface with respect to the longitudinal axis. Further, in the deposition configuration of the tool, the pre-form support surface is disposed adjacent to the first portion. Moreover, in the deposition configuration of the tool, the flange-forming block is spaced apart from the first portion with respect to the transverse axis. For example, the method 300 may include providing the tool 100 in the deposition configuration 105.

At step 330, the method 300 includes depositing a composite material at least partially on each of the first deposition surface of the first portion and the second deposition surface of the second portion in the deposition configuration of the tool to provide a composite pre-form having a first region corresponding to the main body of the composite component and a second region corresponding to the flange of the composite component. For example, the method 300 may include depositing the composite material at least partially on each of the first deposition surface 111 of the first portion 110 and the second deposition surface 121 of the second portion 120 in the deposition configuration 105 of the tool 100 to provide the composite pre-form 140 having the first region 141 corresponding to the main body 52 of the composite component 50 and the second region 142 corresponding to the flange 51 of the composite component 50.

In some embodiments, subsequent to step 330, the method 300 may include performing the flange-forming operation described above.

At step 340, the method 300 includes moving the second portion relative to the first portion to transition the tool from the deposition configuration to the flange-forming configuration. In the flange-forming configuration of the tool, the second deposition surface is spaced apart from the first deposition surface with respect to the transverse axis. Further, in the flange-forming configuration of the tool, the pre-form support surface is spaced apart from the first portion with respect to the longitudinal axis. Moreover, in the flange-forming configuration of the tool, the flange-forming block is disposed between the first portion and the second portion with respect to the longitudinal axis, such that the curved surface of the flange-forming block is at least partially aligned with the first deposition surface. For example, the method 300 may include moving the second portion 120 relative to the first portion 110 to transition the tool 100 from the deposition configuration 105 to the flange-forming configuration 107.

The transition of the tool from the deposition configuration to the flange-forming configuration causes the second region of the composite pre-form to slide relative to the second deposition surface along the longitudinal axis and at least partially engage each of the pre-form support surface of the second portion and the curved surface of the flange-forming block. The curved surface of the flange-forming block defines a radius of the flange of the composite component. For example, the transition of the tool 100 from the deposition configuration 105 to the flange-forming configuration 107 may cause the second region 142 of the composite pre-form 140 to slide relative to the second deposition surface 121 along the longitudinal axis 101 and at least partially engage each of the pre-form support surface 122 of the second portion 120 and the curved surface 131 of the flange-forming block 130. The curved surface 131 of the flange-forming block 130 may define the radius 51R (shown in FIG. 2B) of the flange 51 of the composite component 50.

The method 300 may be used to manufacture the composite component 50 (see FIGS. 2A and 2B) with an improved quality of the flange 51 as compared to conventional manufacturing methods. Specifically, the method 300 may facilitate forming the flange 51 of the composite component 50 in compliance with required design tolerances. For example, the composite component 50 manufactured by the method 300 may have a smooth surface transition from the main body 52 to the flange 51, and the radius 51R of the flange 51 may be within the required design tolerances.

In the flange-forming configuration 107 of the tool 100, the curved surface 131 of the flange-forming block 130 may provide support to the composite pre-form 140, or more specifically, to the second region 142 of the composite pre-form 140. This may ensure that the radius 51R of the flange 51 is formed in compliance with the required design tolerances.

In some embodiments, moving the second portion relative to the first portion to transition the tool from the deposition configuration to the flange-forming configuration includes moving the second portion of the tool along an inclined axis that is oblique to the transverse axis to transition the tool from the deposition configuration to an intermediate configuration. In the intermediate configuration of the tool, the pre-form support surface is spaced apart from the first portion with respect to the longitudinal axis. Further, in the intermediate configuration of the tool, the second deposition surface is spaced apart from the first deposition surface with respect to the transverse axis. Moreover, in the intermediate configuration of the tool, the flange-forming block is spaced apart from the first deposition surface with respect to the transverse axis.

For example, moving the second portion 120 relative to the first portion 110 to transition the tool 100 from the deposition configuration 105 to the flange-forming configuration 107 may include moving the second portion 120 of the tool 100 along the inclined axis 103 that is oblique to the transverse axis 102 to transition the tool 100 from the deposition configuration 105 to the intermediate configuration 106. In some embodiments, moving the second portion 120 relative to the first portion 110 to transition the tool 100 from the deposition configuration 105 to the flange-forming configuration 107 may include moving the second portion 120 of the tool 100 along the movement path 170.

In some embodiments, moving the second portion relative to the first portion to transition the tool from the deposition configuration to the flange-forming configuration further includes moving the second portion of the tool along the transverse axis to transition the tool from the intermediate configuration to the flange-forming configuration. For example, moving the second portion 120 relative to the first portion 110 to transition the tool 100 from the deposition configuration 105 to the flange-forming configuration 107 may further include moving the second portion 120 of the tool 100 along the transverse axis 102 to transition the tool from the intermediate configuration 106 to the flange-forming configuration 105.

In some embodiments, the method 300 further includes moving the curved surface relative to the second portion along the transverse axis to transition the tool to the flange-forming configuration. For example, the method 300 may further include moving the curved surface 131 relative to the second portion 120 along the transverse axis 102 to transition the tool 100 to the flange-forming configuration 107. The curved surface 131 may be moved relative to the second portion 120 along the transverse axis 102 using the threaded portion 132.

The aforementioned movement of the second portion 120 relative to the first portion 110 may ensure that the composite pre-form 140 does not get damaged (e.g., sheared) during the transition of the tool 100 from the deposition configuration 105 to the flange-forming configuration 107. Therefore, the composite component 50 manufactured using the method 300 may have an improved integrity.

In some embodiments, the method 300 further includes providing an external tool including a flange support. The flange support includes a curved support surface corresponding to the curved surface of the flange-forming block. In some embodiments, the method 300 further includes positioning the external tool proximal to the first portion, such that, in the flange-forming configuration of the tool, the pre-form is disposed between and at least partially engaged with the curved support surface of the flange support and the curved surface of the flange-forming block.

For example, the method 300 may include providing the external tool 150 and positioning the external tool 150 proximal to the first portion 110, such that, in the flange-forming configuration 107 of the tool 100, the composite pre-form 140 is disposed between and at least partially engaged with the curved support surface 152 of the flange support 151 and the curved surface 131 of the flange-forming block 130.

The external tool 150 may reduce or prevent sliding of the first region 141 of the composite pre-form 140 relative to the first deposition surface 111 and along the longitudinal axis 101 during the transition of the tool 100 from the deposition configuration 105 to the flange-forming configuration 107.

In some embodiments, the method 300 further includes forming a fluid-tight seal between the first portion, the flange-forming block, and the second portion in the flange-forming configuration. For example, the method 300 may further include forming the fluid-tight seal between the first portion 110, the flange-forming block 130, and the second portion 120 in the flange-forming configuration 107. In some embodiments, the fluid-tight seal may be formed between the first portion 110, the flange-forming block 130, and the second portion 120 in the flange-forming configuration 107 by engagement of the sealing portion 134, or more specifically the one or more protrusions 135, with the seal 180.

In some embodiments, subsequent to step 340, the method 300 may include performing the curing operation described above. The fluid-tight seal formed between the first portion 110, the flange-forming block 130, and the second portion 120 in the flange-forming configuration 107 may allow providing the composite pre-form 140 with vacuum consolidation in the flange-forming configuration 107 during the curing operation.

It will be appreciated that the invention is equally applicable to any structure having a flange or other portions diverting from a main body at one edge of the composite component. In particular, the invention is applicable to both annular and non-annular structures. One example of a non-annular structure is a curved spar for a wing. Spars for wings generally include a central main body and two side flanges.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method for manufacturing a composite component having a main body and a flange that is integral with the main body, the method comprising the steps of:

providing a tool having a longitudinal axis and a transverse axis that is perpendicular to the longitudinal axis, wherein the tool is switchable between a deposition configuration and a flange-forming configuration, the tool comprising;

a first portion comprising a first deposition surface extending along the longitudinal axis;

a second portion that is movable relative to the first portion, the second portion comprising:

a second deposition surface extending along the longitudinal axis; and a pre-form support surface extending along the transverse axis; and a flange-forming block connected to the second portion, the flange-forming block comprising a curved surface;

providing the tool in the deposition configuration, wherein, in the deposition configuration of the tool:

the second deposition surface is aligned with the first deposition surface with respect to the longitudinal axis;

the pre-form support surface is disposed adjacent to the first portion; and the flange-forming block is spaced apart from the first portion with respect to the transverse axis;

depositing a composite material at least partially on each of the first deposition surface of the first portion and the second deposition surface of the second portion in the deposition configuration of the tool to provide a composite pre-form having a first region corresponding to the main body of the composite component and a second region corresponding to the flange of the composite component; and moving the second portion relative to the first portion to transition the tool from the deposition configuration to the flange-forming configuration, wherein, in the flange-forming configuration of the tool:

the second deposition surface is spaced apart from the first deposition surface with respect to the transverse axis;

the pre-form support surface is spaced apart from the first portion with respect to the longitudinal axis; and the flange-forming block is disposed between the first portion and the second portion with respect to the longitudinal axis, such that the curved surface of the flange-forming block is at least partially aligned with the first deposition surface;

wherein the transition of the tool from the deposition configuration to the flange-forming configuration causes the second region of the composite pre-form to slide relative to the second deposition surface along the longitudinal axis and at least partially engage each of the pre-form support surface of the second portion and the curved surface of the flange-forming block, and wherein the curved surface of the flange-forming block defines a radius of the flange of the composite component.

2. A composite component that is manufactured by the method of claim 1.

3. The method of claim 1, further comprising moving the curved surface relative to the second portion along the transverse axis to transition the tool to the flange-forming configuration.

4. The method of claim 1, further comprising forming a fluid-tight seal between the first portion, the flange-forming block, and the second portion in the flange-forming configuration.

5. The method of claim 1, further comprising:

providing an external tool comprising a flange support, the flange support comprising a curved support surface corresponding to the curved surface of the flange-forming block; and positioning the external tool proximal to the first portion, such that, in the flange-forming configuration of the tool, the composite pre-form is disposed between and at least partially engaged with the curved support surface of the flange support and the curved surface of the flange-forming block.

6. The method of claim 1, wherein moving the second portion relative to the first portion to transition the tool from the deposition configuration to the flange-forming configuration comprises:

moving the second portion of the tool along an inclined axis that is oblique to the transverse axis to transition the tool from the deposition configuration to an intermediate configuration, wherein, in the intermediate configuration of the tool:

the pre-form support surface is spaced apart from the first portion with respect to the longitudinal axis;

the second deposition surface is spaced apart from the first deposition surface with respect to the transverse axis; and the flange-forming block is spaced apart from the first deposition surface with respect to the transverse axis.

7. The method of claim 6, wherein moving the second portion relative to the first portion to transition the tool from the deposition configuration to the flange-forming configuration further comprises moving the second portion of the tool along the transverse axis to transition the tool from the intermediate configuration to the flange-forming configuration.

8. A system for manufacturing a composite component having a main body and a flange integral with the main body, the system comprising:

a tool having a longitudinal axis and a transverse axis that is perpendicular to the longitudinal axis, wherein the tool is switchable between a deposition configuration and a flange-forming configuration, the tool comprising:

a first portion comprising a first deposition surface extending along the longitudinal axis;

a second portion that is movable relative to the first portion, the second portion comprising:

a second deposition surface extending along the longitudinal axis; and a pre-form support surface extending along the transverse axis; and a flange-forming block connected to the second portion, the flange-forming block comprising a curved surface; and a deposition device configured to deposit a composite material at least partially on the first deposition surface and the second deposition surface in the deposition configuration of the tool;

wherein, in the deposition configuration:

the second deposition surface is aligned with the first deposition surface with respect to the longitudinal axis;

the pre-form support surface is disposed adjacent to the first portion; and the flange-forming block is spaced apart from the first deposition surface with respect to the transverse axis;

wherein the deposition device deposits the composite material at least partially on each of the first deposition surface of the first portion and the second deposition surface of the second portion in the deposition configuration of the tool to provide a composite pre-form having a first region corresponding to the main body of the composite component and a second region corresponding to the flange of the composite component;

wherein the second portion is moved relative to the first portion to transition the tool from the deposition configuration to the flange-forming configuration, wherein, in the flange-forming configuration:

the second deposition surface is spaced apart from the first deposition surface with respect to the transverse axis;

the pre-form support surface is spaced apart from the first portion with respect to the longitudinal axis; and the flange-forming block is disposed between the first portion and the second portion with respect to the longitudinal axis, such that the curved surface of the flange-forming block is at least partially aligned with the first deposition surface; and wherein the transition of the tool from the deposition configuration to the flange-forming configuration causes the second region of the composite pre-form to slide relative to the second deposition surface along the longitudinal axis and at least partially engage each of the pre-form support surface of the second portion and the curved surface of the flange-forming block, and wherein the curved surface of the flange-forming block defines a radius of the flange of the composite component.

9. The system of claim 8, wherein the flange-forming block further comprises a threaded portion that is threadably connected to the second portion, such that the curved surface is movable relative to the second portion along the transverse axis.

10. The system of claim 8, wherein the tool further comprises a seal configured to form a fluid-tight seal between the first portion, the flange-forming block, and the second portion in the flange-forming configuration.

11. The system of claim 8, further comprising an external tool comprising a flange support, the flange support comprising a curved support surface corresponding to the curved surface of the flange-forming block, wherein the external tool is configured to be positioned proximal to the first portion, such that, in the flange-forming configuration of the tool, the composite pre-form is disposed between and at least partially engaged with the curved support surface of the flange support and the curved surface of the flange-forming block.

12. The system of claim 8, wherein the tool further has an intermediate configuration between the deposition configuration and the flange-forming configuration, wherein in the intermediate configuration:

the pre-form support surface is spaced apart from the first portion with respect to the longitudinal axis;

the second deposition surface is spaced apart from the first deposition surface with respect to the transverse axis; and the flange-forming block is spaced apart from the first deposition surface with respect to the transverse axis.

13. The system of claim 12, wherein:

the second portion moves along an inclined axis that is oblique to the transverse axis to transition the tool from the deposition configuration to the intermediate configuration; and the second portion moves along the transverse axis to transition the tool from the intermediate configuration to the flange-forming configuration.

14. The system of claim 12, wherein the tool further comprises a slide configured to move the second portion along a movement path, the movement path comprising:

a first path portion obliquely inclined with respect to the transverse axis and extending away from the first portion, wherein a movement of the second portion along the first path portion transitions the tool from the deposition configuration to the intermediate configuration; and a second path portion extending along the transverse axis, wherein the movement of the second portion along the second path portion transitions the tool from the intermediate configuration to the flange-forming configuration.

* * * * *